United States Patent [19]

Loth

[11] 4,199,274

[45] Apr. 22, 1980

[54] FLOW MEASURING FLUME OF ADJUSTABLE CAPACITY

[76] Inventor: John L. Loth, P.O. Box 4094, Morgantown, W. Va. 46505

[21] Appl. No.: 894,239

[22] Filed: Apr. 7, 1978

[51] Int. Cl.$^2$ ............................................... E02B 7/26
[52] U.S. Cl. ...................................... 405/103; 405/80; 405/87
[58] Field of Search ...................... 405/118, 87, 88, 89, 405/90, 91, 103; 137/604

[56] References Cited

U.S. PATENT DOCUMENTS

| | | | |
|---|---|---|---|
| 28,201 | 5/1860 | Seely | 405/103 |
| 1,064,908 | 6/1913 | Hornung | 405/89 |
| 1,210,944 | 1/1917 | Keeler | 405/89 |
| 1,410,746 | 3/1922 | Gilgan | 405/89 |
| 1,901,956 | 3/1933 | Gilbert | 405/90 |
| 2,268,480 | 12/1941 | Hardison | 405/90 |
| 2,928,251 | 3/1960 | Waring | 405/90 |
| 3,133,558 | 5/1964 | Fajans et al. | 137/604 X |

FOREIGN PATENT DOCUMENTS 481583   8/1929   Fed. Rep. of Germany ............. 405/87

*Primary Examiner*—Dennis L. Taylor
*Attorney, Agent, or Firm*—Schuyler, Birch, McKie & Beckett

[57] ABSTRACT

A flow measuring flume is described which is compact, cost-effective, self-cleaning and of adjustable capacity. This flume is applicable in the chemical water treatment of acid discharge streams from coal mining operations. It incorporates the self-cleaning advantage of the Parshall venturi flume but without the fixed throat size limitation of a venturi. It further incorporates the adjustable capacity of the notched weir type flow meter without the debris blocking characteristic of the dam like weir. The flume comprises a rectangular open channel with a triangular base and with a discharge opening in one of its two side walls, adjacent to the common corner. A sliding door is used to adjust the discharge opening width, but does not alter the geometric similarity or flow discharge characteristics per unit width of outlet. In addition this flume has one side wall higher than the other for the purpose of protecting equipment from flood damage. When used for chemical water treatment a tank and flow head measuring well can be safely mounted behind the high side wall. The flume discharge nappe springs clear from the flume and drops down on a built-in vortex generating spillway, which maximizes aeration and mixing of the flow.

9 Claims, 1 Drawing Figure

U.S. Patent
Apr. 22, 1980
4,199,274
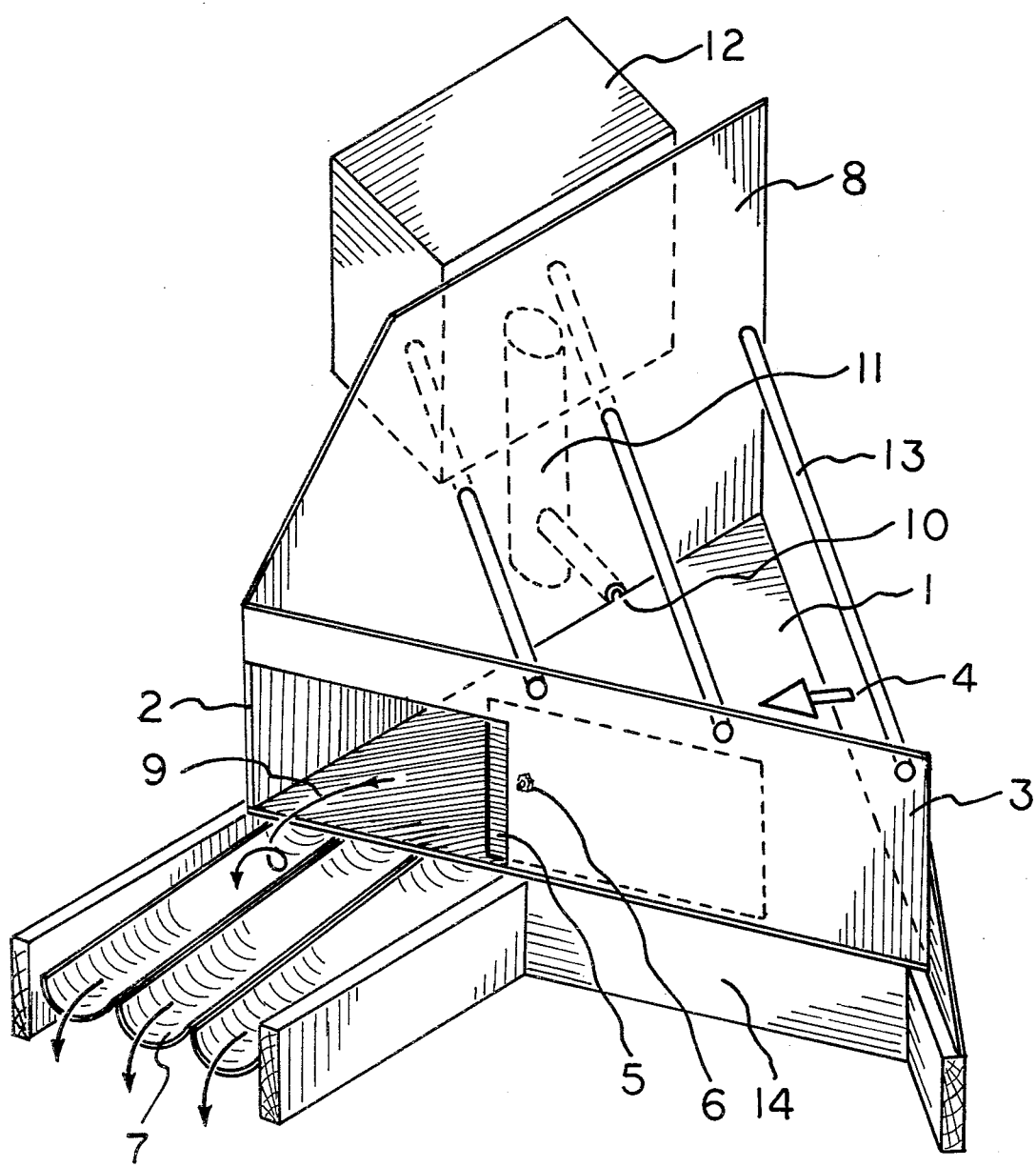

FLOW MEASURING FLUME OF ADJUSTABLE CAPACITY

BACKGROUND OF THE INVENTION

Most industrial devices for the measurement of flow rates in open channels are described in the "Water Measurement Manual" published by the U.S. Department of Interior and available from the U.S. Government Printing Office. Of the many available configurations the notched weir and the Parshall venturi flume are most widely used. The notched weir is basically a dam with an opening or notch in the upper edge through which the water flows. The water level height above the bottom of the notch is used to measure the flow rate. The notch width and the corresponding operating capacity can be adjusted with a sliding door. The water after flowing through the notch must "spring clear" of the flume to get accuracy better than 3%. The dam formed by the weir will catch debris and limits the use of notched weirs to relatively clean streams. In chemical water treatment of acid mine drainage, such as in coal preparation plants and in discharge streams from coal mining operations, there is a need for a self-cleaning flow measuring device which can pass debris, rocks and silt without problems. For such applications the Parshall venturi flume is often used. This is a converging channel followed by a constant area throat section which continues smoothly into a diverging channel section. The operating range is fixed because of the fixed throat width, which cannot be adjusted without creating a flow discontinuity and altering the discharge characteristics of the venturi.

SUMMARY OF THE INVENTION

This invention provides for an adjustable flow measuring flume which combines the desirable features of both the notched weir and the Parshall flume without incorporating their limitations. The flow capacity can be adjusted over a ten fold range without altering the geometric similarity or discharge characteristics per unit width of opening. In addition the required length and cost are cut to about half. These advantages are obtained at the expense of the flow measurement accuracy which is only better than 10%. In many coal mining applications the acidity varies so greatly from day to day that the reduced flow measurement accuracy is acceptable.

The adjustable flow measuring flume is a rectangular open channel with a triangular base. The two side walls join at a down stream common corner. A rectangular opening in one of the two side walls, adjacent to the common corner, provides an outlet for the flow. The flow discharging from the opening springs clear from the flume, much like that in the notched weir. The width of the opening can be varied with a single sliding door without altering the geometric similarity of the adjustable measuring flume or its discharge characteristics per unit width of opening. This is its most significant advantage over the Parshall flume but also over the notched weir. Note when the width of a notched weir is adjusted, using double sliding doors, then also the end contraction is varied which might alter its discharge characteristics. The absence of a dam like weir in the adjustable triangular flume makes it also self-cleaning. The slight turning of the flow, induced by the side wall outlet, causes a rotation of the discharge which is transformed into one or more vortices when the discharge drops onto the vortex generating spillway. This spillway comprises of parallel semicylindrical troughs which are placed below and at a slight angle to the flow. The associated whirl increases the flow aeration and mixing.

The channel wall opposite to the outlet side is made higher in order to protect equipment placed behind it from flood damage. In case of a flood, water will spill over the outlet side channel wall which is lower and therefore the high wall will protect the equipment from being washed away.

BRIEF DESCRIPTION OF THE DRAWING

All the innovative aspects of the Flow Measuring Flume of Adjustable Capacity are shown in a single drawing. The triangular shaped flume has the flow to be measured entering from the right as shown by the large arrow and discharging through the side wall opening in the foreground. Three vortex generating, semicylindrical discharge troughs are shown at a slight angle to the average flow direction. When the discharge nappe falls on this spillway then these troughs create a whirl in the fluid as indicated by the arrows. The dashed outline behind the side wall on the foreground is the sliding door in its almost full open position. This door can be moved to the left to any position up to one inch from the common corner of the side walls. This sliding door permits a ten fold range in operating capacity. Three steel reinforced bars are shown to brace the side walls and two of them continue through the high side wall to provide support for the optional chemical metering tank. The entire unit could be made of PVC and mounted on a permanently attached pressure treated wooden skid for protection in shipping and in the field. The wooden skid is shown in the drawings as the base.

DETAILED DESCRIPTION OF PREFERRED EMBODIMENT

The flow measuring flume of adjustable capacity comprises a two-sided rectangular open channel as shown in the drawing. The bottom 1 of the channel has the shape of an isosceles triangle. The two side walls converge to a common corner 2 of about 45 degrees included angle. The lower of the two side walls 3 is shown in the foreground and has a rectangular outlet opening adjacent to the common corner 2. The flow to be measured enters the measuring flume as shown by arrow 4 and discharges through the outlet opening. The width of this outlet opening can be varied with the rectangular sliding door 5, which is shown in its almost full open position. The door is held in position by bolt 6. Several predrilled positions are used, the smallest of which should not be less than 1 inch in order to maintain reasonable accuracy and keep the flume self cleaning. Note that adjusting the outlet opening width does not alter the geometric similarity of the flow field. This is the unique feature of this configuration which maintains the same head—discharge characteristic per unit width of opening for all door positions. As the flow discharge springs clear of the sides of the outlet opening, it lands on the vortex-generating spillway 7. The spillway consists of one or more parallel semi-cylindrical troughs placed at a slight angle to the average horizontal discharge direction of the flow. Three troughs are shown here, which are parallel to the far side wall 8 of the flume. The impact angle together with the semi-cylindrical shape of the spillway troughs causes the flow to whirl in the direction indicated by the arrow 9. This whirl increases aeration and mixing of the flow which is particularly important when this measuring flume is used for chemical water treatment of acid drainage streams from coal mining operations. In this case the liquid chemicals will be supplied through the "head" measuring hole 10. This hole 10 is located in the far side wall 8 at a minimum distance from the common corner 2. This minimum distance should not be less than two and a half times the maximum width of the outlet opening. The "head" or liquid level in the measuring flume is duplicated in the well 11 which is connected to the flume by a tube entering at hole 10. A float on the end of a metering pin located inside well 11 is used to drain a chemical from tank 12 at a rate which is in pre-set proportion to the flow rate in the flume. The side wall 3 in the foreground is lower than the far side wall 8 so that in case of a flood the excess flow will spill over wall 3 and the high side 8 will protect tank 12 from silt and the force of the flood. To overcome the side wall spreading force, horizontal plastic covered steel bars 13, are used. They are positioned well above the maximum usable flow head. Two of these steel bars are extended behind the high wall 8 so as to provide support for tank 12. The entire flow measuring flume is permanently mounted on a pressure treated wooden skid 14 which gives protection to the flume during shipping and installation.

A PVC sheet construction is recommended for mine acid treatment units as it is durable and cost-effective. The typical dimensions for a 500 GPM unit are 3½ foot wide, 2½ foot high and 4½ foot long and weighing less than 100 pounds including the chemical additive metering tank. The compact size and light weight make it portable and easy to install.

I claim:

1. A flow metering flume of adjustable capacity comprising a horizontal triangular base; two vertical side walls each attached to one of the sides of said horizontal triangular base, said side walls being joined together at one corner of said triangular base, one of said vertical side walls having an opening which is flush with said horizontal triangular base and begins at said one corner of said horizontal triangular base and extends a predetermined distance along said one vertical side wall, the flow through said flume entering the open side of said horizontal triangular base and discharging through said opening; and a sliding door for adjusting the width of said opening without altering the geometry of said flume to thereby maintain the same discharge characteristic per unit width of said opening.

2. The flume of claim 1 wherein one of said vertical side walls is substantially higher than the other so that, in case of a flood, the excess water will spill over the lower of said vertical side walls to thereby allow the higher of said vertical side walls to protect any equipment behind it.

3. The flume of claim 1 further comprising horizontal plastic covered metal bars connected between the tops of said vertical side walls to prevent said vertical side walls from spreading.

4. The flume of claim 1 further comprising a vortex generating spillway connected to said horizontal triangular base below said opening to increase the mixing and aeration of the discharge flow, said spillway including one or more parallel semi-cylindrical troughs with their axis placed at an angle to the average direction of the flow discharge from said opening.

5. The flume of claim 1 further comprising a base formed by a permanent wooden skid for protection during transportation and in the field.

6. A water treatment device comprising:
   a flow metering flume of adjustable capacity for conveying water including a horizontal triangular base, two vertical side walls each attached to one of the sides of said horizontal triangular base, said side walls being joined together at one corner of said triangular base, one of said vertical side walls having an opening which is flush with said horizontal triangular base and begins at said one corner of said horizontal triangular base and extends a predetermined distance along said one vertical side wall, the flow through said flume entering the open side of said horizontal triangular base and discharging through said opening, and a sliding door for adjusting the width of said opening without altering the geometry of said flume to thereby maintain the same discharge characteristic per unit width of said opening; and
   a chemical additive metering tank connected to said flow metering flume for supplying chemical additives to the water conveyed by said flow metering flume.

7. The water treatment device according to claim 6 wherein said chemical additive metering tank supplies chemical additives to the water through an opening in the highest of said vertical side walls.

8. The water treatment device according to claim 7 further comprising a well connected to said flow metering flume through said opening in said other one of said vertical side walls for duplicating the water level in said flow metering flume, the chemical additives from said chemical additive metering tank being supplied to said flow metering flume through said well.

9. The water treatment device in claim 6 further comprising a vortex generating spillway connected to said horizontal triangular base below said opening to increase the mixing and aeration of the discharge flow, said spillway including one or more parallel semi-cylindrical troughs with their axis placed at an angle to the average direction of the flow discharge from said opening.

* * * * *